(12) United States Patent
Molter

(10) Patent No.: US 6,706,436 B2
(45) Date of Patent: Mar. 16, 2004

(54) ELECTROCHEMICAL CELL DESIGN USING A BIPOLAR PLATE

(75) Inventor: Trent M. Molter, Glastonbury, CT (US)

(73) Assignee: Proton Energy Systems, Inc., Rocky Hill, CT (US)

( * ) Notice: Subject to any disclaimer, the term of this patent is extended or adjusted under 35 U.S.C. 154(b) by 13 days.

(21) Appl. No.: 09/747,550

(22) Filed: Dec. 22, 2000

(65) Prior Publication Data

US 2001/0049044 A1 Dec. 6, 2001

Related U.S. Application Data

(60) Provisional application No. 60/171,419, filed on Dec. 22, 1999.

(51) Int. Cl.[7] .......................... H01M 8/04; H01M 8/10
(52) U.S. Cl. ........................ 429/34; 429/32; 429/39
(58) Field of Search ........................ 429/34, 39, 32

(56) References Cited

U.S. PATENT DOCUMENTS

| 4,619,753 | A | | 10/1986 | Christen et al. |
|---|---|---|---|---|
| 5,521,018 | A | | 5/1996 | Wilkinson et al. |
| 5,547,777 | A | | 8/1996 | Richards |
| 5,776,624 | A | * | 7/1998 | Neutzler ............... 429/26 |
| 5,798,187 | A | | 8/1998 | Wilson et al. ............... 429/26 |
| 6,248,467 | B1 | * | 6/2001 | Wilson et al. ............ 429/34 X |
| 6,322,919 | B1 | * | 11/2001 | Yang et al. ............... 429/34 |

FOREIGN PATENT DOCUMENTS

| EP | 0 851 518 A1 | 7/1998 |
|---|---|---|
| WO | WO 98/33221 | 7/1998 |
| WO | WO 99/56333 | 11/1999 |
| WO | WO 00/31815 | 6/2000 |

* cited by examiner

Primary Examiner—John S. Maples
(74) Attorney, Agent, or Firm—Cantor Colburn LLP

(57) ABSTRACT

An electrochemical cell arrangement using a bipolar plate is disclosed, wherein the bipolar plates are formed from single or multiple sheets of metal foil, preferably titanium, embossed with the fluid fields. The bipolar plate, which forms the oxygen, hydrogen, and coolant passages and acts as a separator between adjacent cells of a cell stack, is lightweight, small compared to conventional bipolar plates, ductile, inexpensive, and easy to produce.

27 Claims, 6 Drawing Sheets

ELECTROCHEMICAL CELL DESIGN USING A BIPOLAR PLATE

CROSS-REFERENCE TO RELATED APPLICATION

This application claims the benefit of U.S. Provisional Application No. 60/171,419, filed on Dec. 22, 1999 which is incorporated herein by reference.

BACKGROUND OF THE INVENTION

The present invention relates to electrochemical cells, and in particular to bipolar plates for use in electrochemical cells.

Electrochemical cells are energy conversion devices, usually classified as either electrolysis cells or fuel cells. An electrolysis cell typically generates hydrogen by the electrolytic decomposition of water to produce hydrogen and oxygen gases, and functions as a fuel cell by electrochemically reacting hydrogen with oxygen to generate electricity.

Referring to FIG. 1, a partial section of a typical proton exchange membrane fuel cell 10 is detailed. In fuel cell 10, hydrogen gas 12 and reactant water 14 are introduced to a hydrogen electrode (anode) 16, while oxygen gas 18 is introduced to an oxygen electrode (cathode) 20. The hydrogen gas 12 for fuel cell operation can originate from a pure hydrogen source, methanol or other hydrogen source. Hydrogen gas electrochemically reacts at anode 16 to produce hydrogen ions (protons) and electrons, wherein the electrons flow from anode 16 through an electrically connected external load 22, and the protons migrate through a membrane 24 to cathode 20. At cathode 20, the protons and electrons react with the oxygen gas to form resultant water 14', which additionally includes any reactant water 14 dragged through membrane 24 to cathode 20. The electrical potential across anode 16 and cathode 20 can be exploited to power an external load.

The same configuration as is shown in FIG. 1 for a fuel cell is conventionally employed for electrolysis cells. In a typical anode feed water electrolysis cell, process water is fed into a cell on the side of the oxygen electrode (in an electrolytic cell, the anode) to form oxygen gas, electrons, and protons. The electrolytic reaction is facilitated by the positive terminal of a power source electrically connected to the anode and the negative terminal of the power source connected to a hydrogen electrode (in an electrolytic cell, the cathode). The oxygen gas and a portion of the process water exit the cell, while protons and water migrate across the proton exchange membrane to the cathode where hydrogen gas is formed. In a cathode feed electrolysis cell, process water is fed on the hydrogen electrode, and a portion of the water migrates from the cathode across the membrane to the anode where protons and oxygen gas are formed. A portion of the process water exits the cell at the cathode side without passing through the membrane. The protons migrate across the membrane to the cathode where hydrogen gas is formed.

In certain arrangements, the electrochemical cells can be employed to both convert electricity into hydrogen, and hydrogen back into electricity as needed. Such systems are commonly referred to as regenerative fuel cell systems.

The typical electrochemical cell includes a number of individual cells arranged in a stack, with the working fluid directed through the cells via input and output conduits formed within the stack structure. The cells within the stack are sequentially arranged, each including a cathode, a proton exchange membrane, and an anode. In certain conventional arrangements, the anode, cathode, or both are gas diffusion electrodes that facilitate gas diffusion to the membrane. Each cathode/membrane/anode assembly (hereinafter "membrane electrode assembly", or "MEA") is typically supported on both sides by flow fields comprising screen packs or bipolar plates. Such flow fields facilitate fluid movement and membrane hydration and provide mechanical support for the MEA.

Fuel cells and, to a lesser extent electrolytic cells, have made extensive use of bipolar plates to provide fluids flow fields, sealing, and electrical continuity between cells in a cell stack. Use of bipolar plates can reduce cell stack size by replacing the separator plates, insulator plates, and at least two screen packs that are otherwise required with a single unit, the bipolar plate. The bipolar plate accordingly acts as both the hydrogen and oxygen flow fields and sealing member, thereby simplifying the stack and rendering it particularly useful in situations where space limitations are a controlling factor, for example in the automotive industry.

Conventional bipolar plates are typically molded or machined from carbon or composite blocks into the desired shape. However, in order to obtain the proper structural integrity and to enable the necessary machining, these components are typically very thick, on the order of greater than about 0.125 inches (about microns), especially in electrolytic cells, which often operate under high pressure differentials. Consequently, bipolar plates are often heavy and costly. Furthermore, the carbon plates are brittle, rendering these plates less useful for mobile electrochemical cell applications where shock and vibration are critical factors.

What is accordingly needed in the art is a ductile, light weight, less costly, readily produced bipolar plate assembly having high structural integrity.

SUMMARY OF THE INVENTION

A low-cost bipolar plate assembly for electrochemical reactors such as fuel cells and electrolysis cells comprises at least one foil sheet of an electrically conductive material having flow fields formed thereon.

An electrochemical cell stack using the bipolar plate accordingly comprises at least two membrane assemblies, each having an anode electrode and a cathode electrode disposed on opposite sides of an electrolyte membrane; a bipolar plate comprising at least one foil sheet of an electrically conductive material, wherein the sheet has a hydrogen flow field and an oxygen flow field to form separate hydrogen and oxygen flow passages, said bipolar plate being disposed between an anode electrode of one membrane assembly and a cathode electrode of another membrane assembly; and two end plates, one disposed on each end of the electrochemical cell adjacent to a first membrane assembly and a last membrane assembly.

BRIEF DESCRIPTION OF THE DRAWINGS

Referring now to the drawings, which are meant to be exemplary, not limiting, and wherein like elements are numbered alike in the several FIGS.

DETAILED DESCRIPTION OF THE PREFERRED EMBODIMENTS

Figure 1:
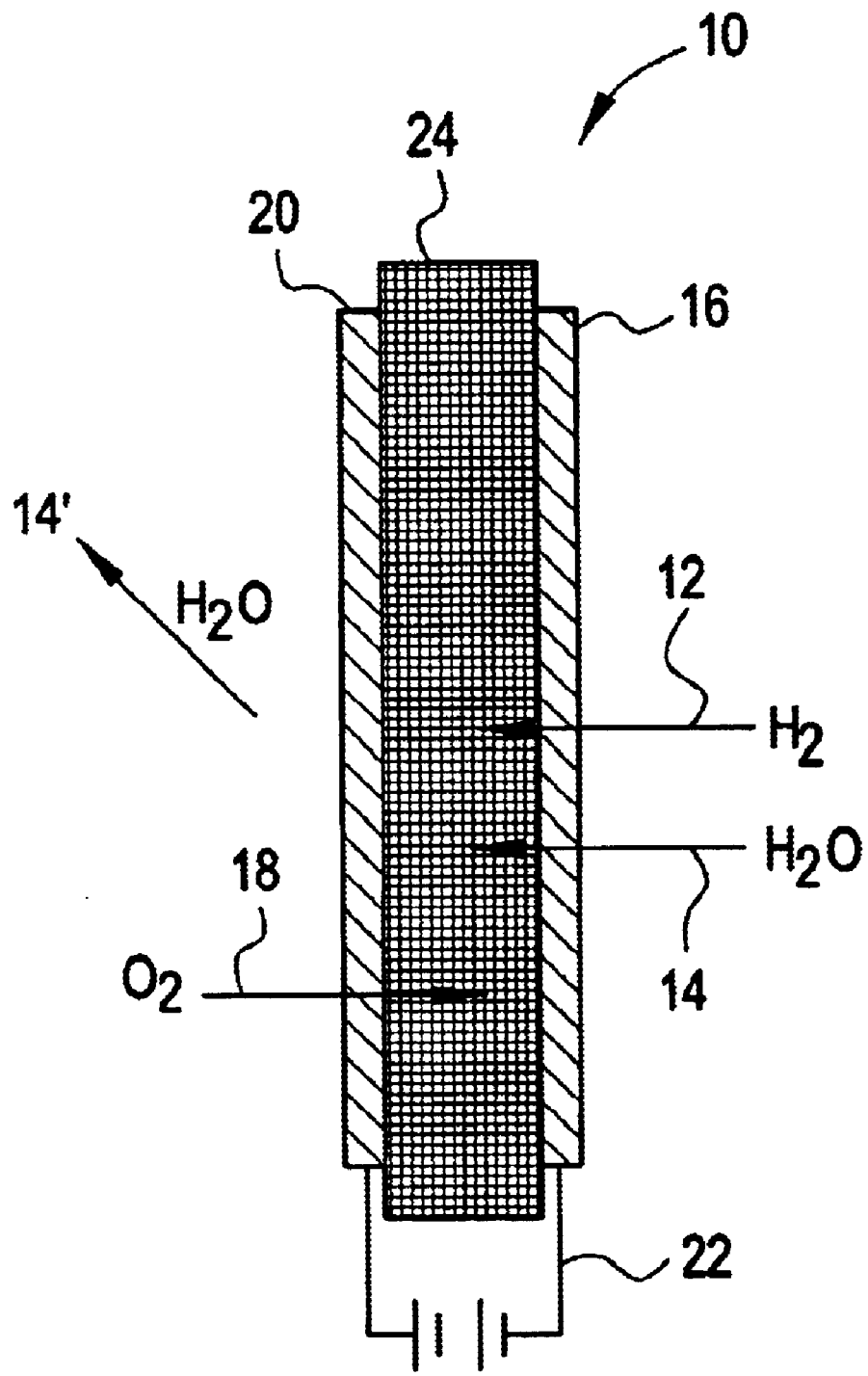
FIG. 1 is a schematic diagram of a prior art fuel cell showing a typical fuel cell reaction.

A bipolar plate for use in electrochemical cell stacks comprises one or more metal sheets constructed from foils having flow fields formed thereon. The bipolar plates have an overall geometry compatible with the electrochemical cell, i.e., typically square, rectangular, circular, octagonal, hexagonal, or the like. One or more foils can be used to create flow passages for reactants such as hydrogen/fuel, air/oxygen, and other electrochemical cell reactants and/or products, and, optionally, coolant, within each cell. The perimeter of each bipolar plate is sealed using a gasket, typically rubber, plastic, or another ductile material or combinations thereof, placed in compression, using tie rods running through or around each of the cell components.

The foils can be any material which is electrically conductive, compatible with the electrochemical cell environment, capable of having flow fields formed thereon, and which maintain sufficient structural integrity to withstand the cell operating conditions without cracking or otherwise failing such that the reactants and/or coolant can mix. Preferably this foil possesses sufficient structural integrity and elasticity to form a spring between the membrane and electrode assembly and the remainder of the cell, thereby inhibiting creep by providing a substantially uniform compression of the membrane and electrode assembly. Possible materials include, but are not limited to, metals, metal alloys, and metal superalloys such as iron and iron alloys such as stainless steel, titanium, niobium, nickel and nickel alloys such as HASTELLOY® (commercially available from Haynes International, Kokomo, Ind.), cobalt and cobalt superalloys such as ELGILOY® (commercially available from Elgiloy® Limited Partnership, Elgin, Ill.) and MP35N® (commercially available from Maryland Specialty Wire, Inc., Rye, N.Y.), hafnium, zirconium, tungsten, and tantalum, among others, with titanium preferred because of its strength, durability, availability, low cost, ductility, low density, and its compatibility with the electrochemical cell environment.

The foil has a thickness sufficient to withstand the pressures within the cell stack during operation, i.e., has sufficient structural integrity. For a titanium foil bipolar plate having a single layer, for example, the foil thickness can be about 1 to about 20 mils, with about 2 to about 10 mils preferred. Overall bipolar plate thickness, regardless of the number of layers, is typically less than about 10 mils, with about 2 mils to about 5 mils preferred.

In forming the bipolar plate, one or multiple sheets of the foil can have the flow fields formed thereon, with the desired number of sheets being based upon the desired number of flow fields. Typically, a system having separate hydrogen/fuel, oxygen/air, and coolant flow fields, i.e., a fuel cell application, will employ two sheets even though more sheets can be employed. Meanwhile, a single sheet is preferred in an electrolysis cell application having separate hydrogen/fuel and oxygen/air flow fields.

In one embodiment, one or multiple sheets can be embossed with the desired flow fields. The embossing can be performed using conventional foil forming processes such as stamping, isostatic pressing, rolling, among others capable of forming the flow passages into the foil without over stretching the metal and/or otherwise forming weak areas prone to failure. Other flow field forming techniques can also be employed such as molding (e.g., injection molding), casting, or another technique.

The flow passages can have any size and geometry which preferably creates flows useful in introducing the reactants, removing products, and preferably cooling the cell with a size and geometry without zones of limited flow preferred. In a fuel cell, for example, the flow fields need a size and geometry to introduce sufficient hydrogen to the anode, oxygen to the cathode, and to remove sufficient water from the cathode. In one electrolysis application, the flow fields need a size and geometry to introduce sufficient water to the cathode, and to remove sufficient hydrogen and water from the cathode and sufficient oxygen from the anode. The flow passages can be square, rectangular, semicircular, multi-sided, substantially annular or any other shape and can form any desired overall flow field shape, such as linear, spiral, zig-zag, or any other.

Typically, for an electrolysis cell stack, the foil has a diameter of up to about 1.5 feet (0.46 meters) or greater, with a diameter of about 0.15 feet (0.046 meters) to about 1.0 foot (0.31 meters) preferred. Also, although the foil typically has a thickness of up to about 0.0025 inches (63.5 microns) or greater, with 0.0001 inches (2.54 microns) to 0.0015 inches (38.1 microns) preferred, the specific preferred thickness is based on the desired dimensions of the electrochemical cell.

For fuel cells, as stated above, the bipolar plate preferably has at least one coolant flow field therethrough to remove heat build-up in the cell caused by the exothermal reaction therein, and thereby prevent degradation of the membrane assembly. Consequently, at least one coolant passage is preferably formed through at least one of the assembled bipolar plates such that a coolant, such as water, ethylene glycol, alcohols, among others, can pass adjacent to substantially all of the membrane assembly to remove excess heat. This coolant flow field and the associated coolant flow passages typically has a similar size and geometry as the other flow fields and passages of the respective bipolar plate.

Figure 2:
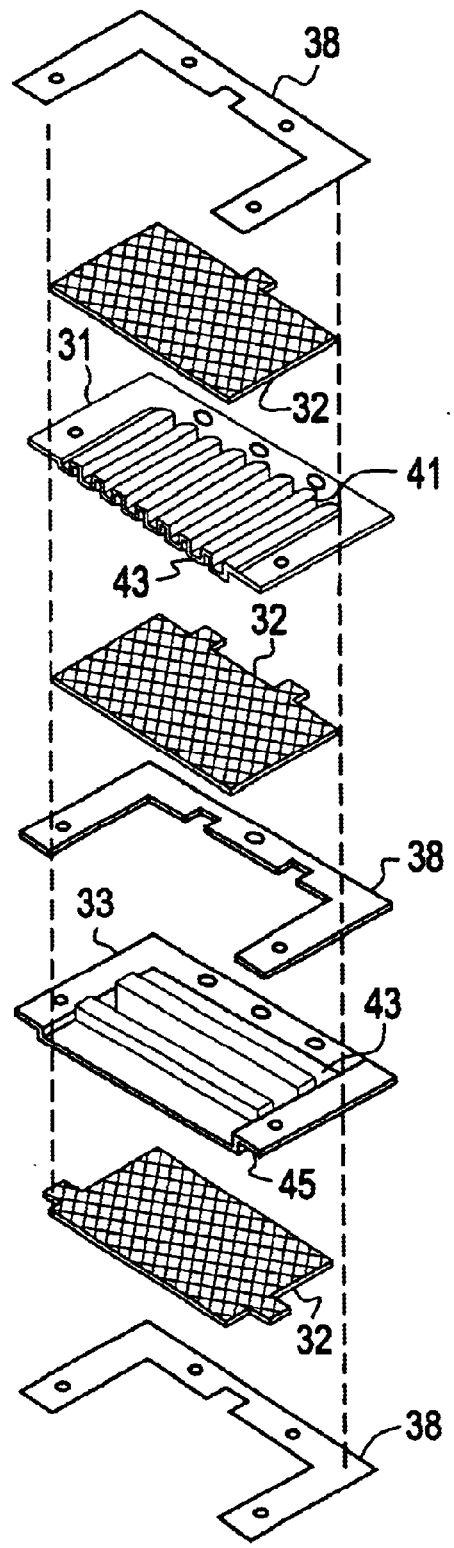
FIG. 2 is an expanded cross-sectional view of one embodiment of a bipolar plate assembly of the present invention.

Referring to FIG. 2, the bipolar plate can comprise foil sheets 31, 33, and is preferably assembled so as to form oxygen passage 41, hydrogen passage 45, and coolant passage 43 formed between the hydrogen passage 45 and oxygen passage 41. Each side of the bipolar plate can include electrode supports 32 to prevent extrusion of the membrane assembly into the passages, and conventional components, such as protector rings, gaskets, etc. (not shown). Although the electrode supports 32 can be any porous medium capable of supporting the membrane assembly while providing fluid communication under acceptable mass flow conditions, they are typically carbon paper, cloth, or felt, porous metal, or another thin material having similar mass transfer capabilities, a metal fiber or metal particulate plate (which may be sintered), an expanded metal screen, a woven or nonwoven screen, or a combination thereof. The expanded metal screen, for example, can be any conventional screen capable of supporting the membrane, allowing the passage of hydrogen gas and water, and oxygen gas and water, respectively, and of passing electrical current. In order to address pressure and other stress issues, the screen size and strand thickness can be adjusted, by individual layers or for the entire screen pack.

For example, typically the screens comprise one or more layers of etched or perforated sheets or a woven metal mesh having a screen size of up to about 7/0 typically employed, with a size of about 3/0 to about 5/0 preferred for most applications, and wit a strand thickness of about 0.005 inches (127 microns) preferred forte screen layer disposed adjacent the membrane and electrode assembly on the low pressure side of the cell, with subsequent strand thicknesses of about 0.005 inches and greater generally preferred for the remaining screen layers. The screens can be composed of material including iron (such as stainless steel), nickel, niobium, zirconium, cobalt, tantalum, titanium, carbon, hafnium, among others, alloys, and super alloys thereof. The geometry of the openings in the screens often ranges from ovals, circles and hexagons to diamonds and other elongated shapes.

The protector rings can be any metal, polymeric, or combination member capable of providing adequate membrane support around the edge of the active area of the cell. These structures are thin, typically about 1 mil (25.4 microns) to about 3 mils (76.2 microns), and have a geometry substantially similar to the flow field geometry in order to be disposed about the outer edge of the outer circumference of the bipolar plate, bridging the gaps formed between cell components.

Gaskets 38 located between the various foil sheets 31, 33 and between the foil sheets 31, 33 and protector rings (not shown), form fluid tight seals to prevent leaking and/or mixing of the hydrogen, oxygen, and/or coolant. Although these gaskets can be any non-metallic, elastic medium compatible with the electrochemical cell environment and capable of forming the desired seals, such as plastic or rubber, these gaskets are preferably rubber because of its compliance over the cell sealing faces and are typically formed from virgin elastomers having a low concentration (i.e., less than about 0.01 weight percent) of fillers or other impurities. Rubber gaskets produced via liquid injection molding are especially preferred due to their cost, ease of production, and reliability in electrochemical cells.

Figure 3:
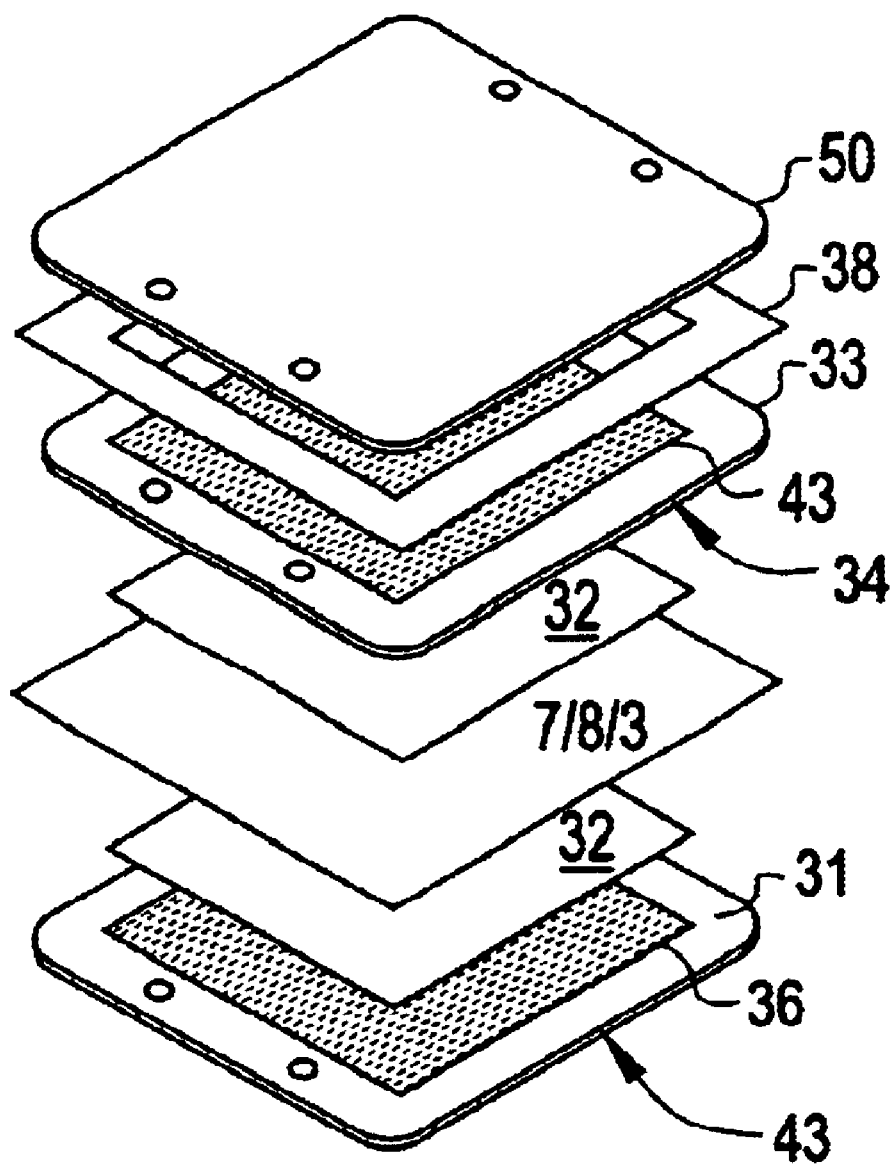
FIG. 3 is an expanded view of one embodiment of a bipolar electrochemical cell of the present invention.

Referring to FIG. 3, the hydrogen flow field 36 is disposed adjacent to the membrane and electrode assembly (7/8/3) with electrode support 32 disposed therebetween and in intimate contact therewith. On the opposite side of the membrane and electrode assembly (7/8/3) is a bipolar plate 33 having, on one side, an oxygen flow field 34 disposed in contact with the electrode support 32 which contacts the membrane and electrode assembly (7/8/3), and on the opposite side, a coolant flow field 43. Gasket 38 is preferably employed in contact with the bipolar plate 33 and end-plate 50. In a cell stack, instead of end plate 50, the bipolar plate 31 for the subsequent cell would be disposed in contact with gasket 38.

Figure 4:
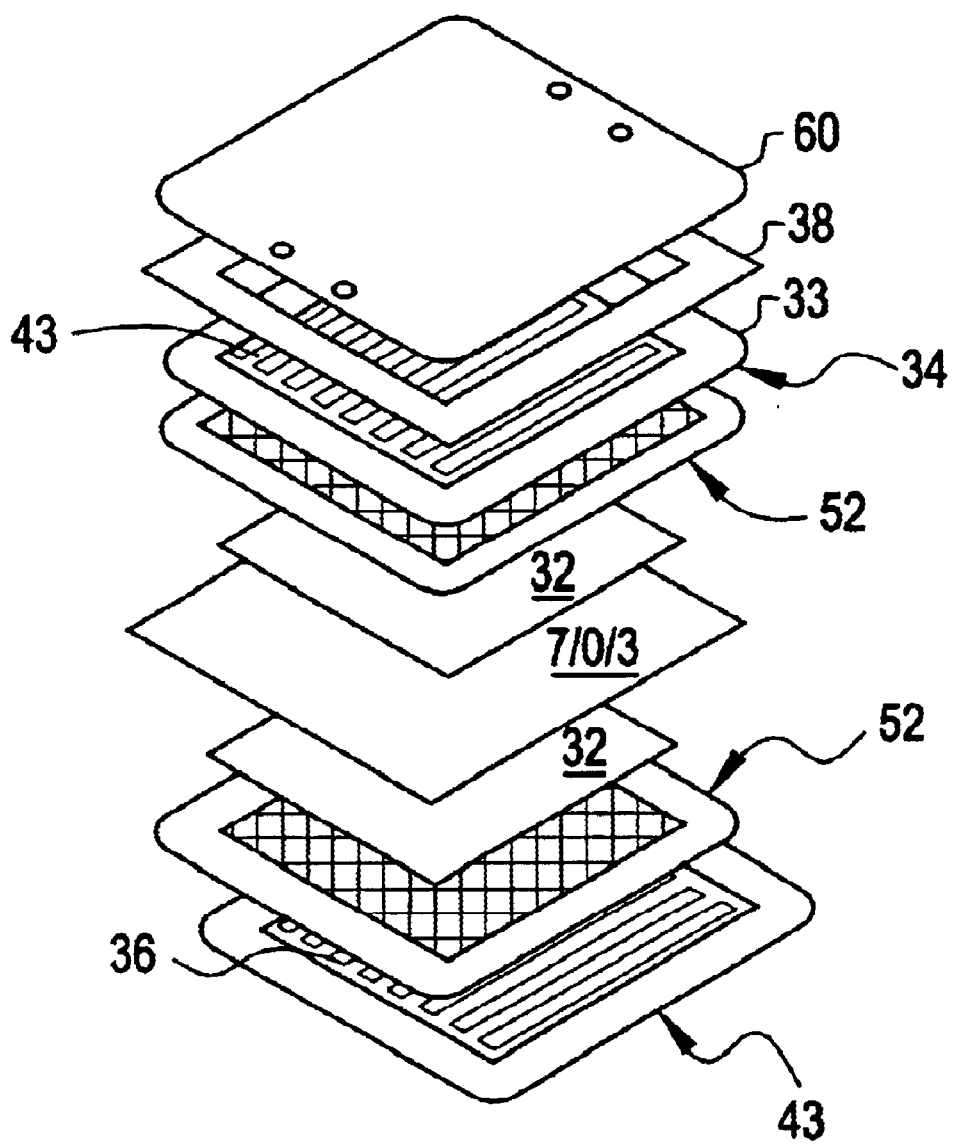
FIG. 4 is an expanded cross-sectional view of another embodiment of a bipolar plate assembly of the present invention.
Figure 5:
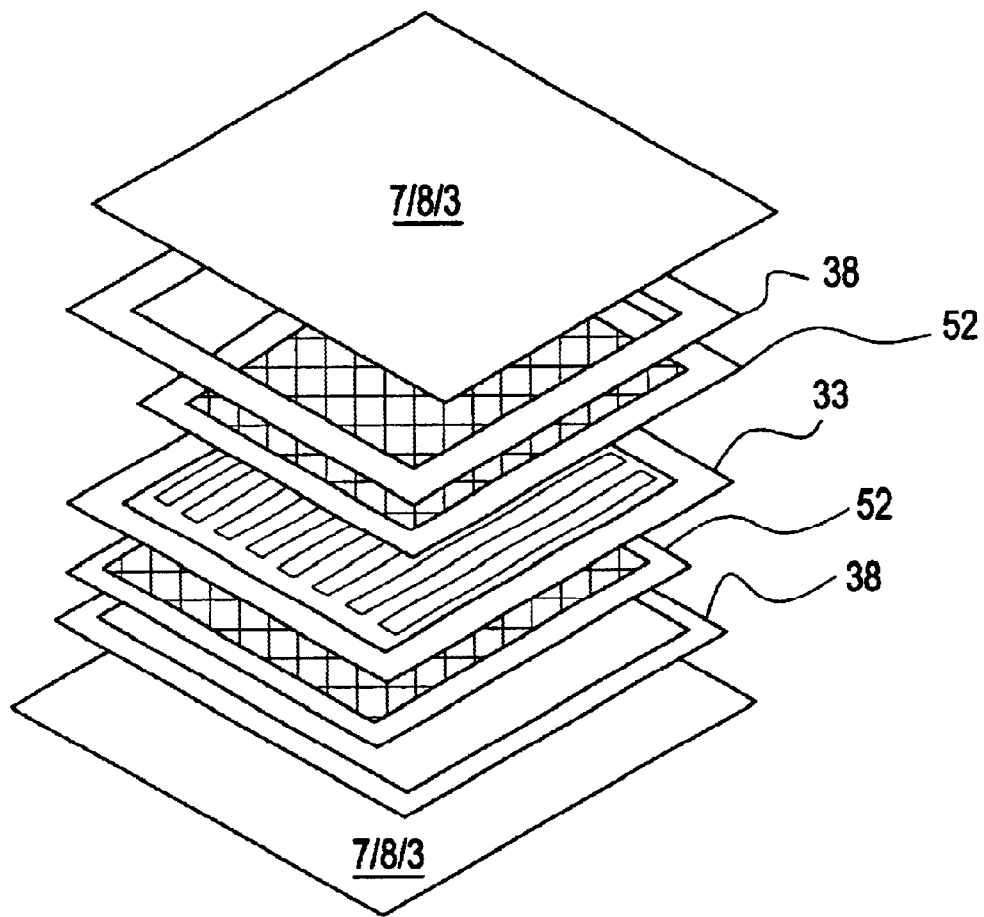
FIG. 5 is an expanded cross-sectional view of another embodiment of a bipolar electrochemical cell of to present invention.
Figure 6:
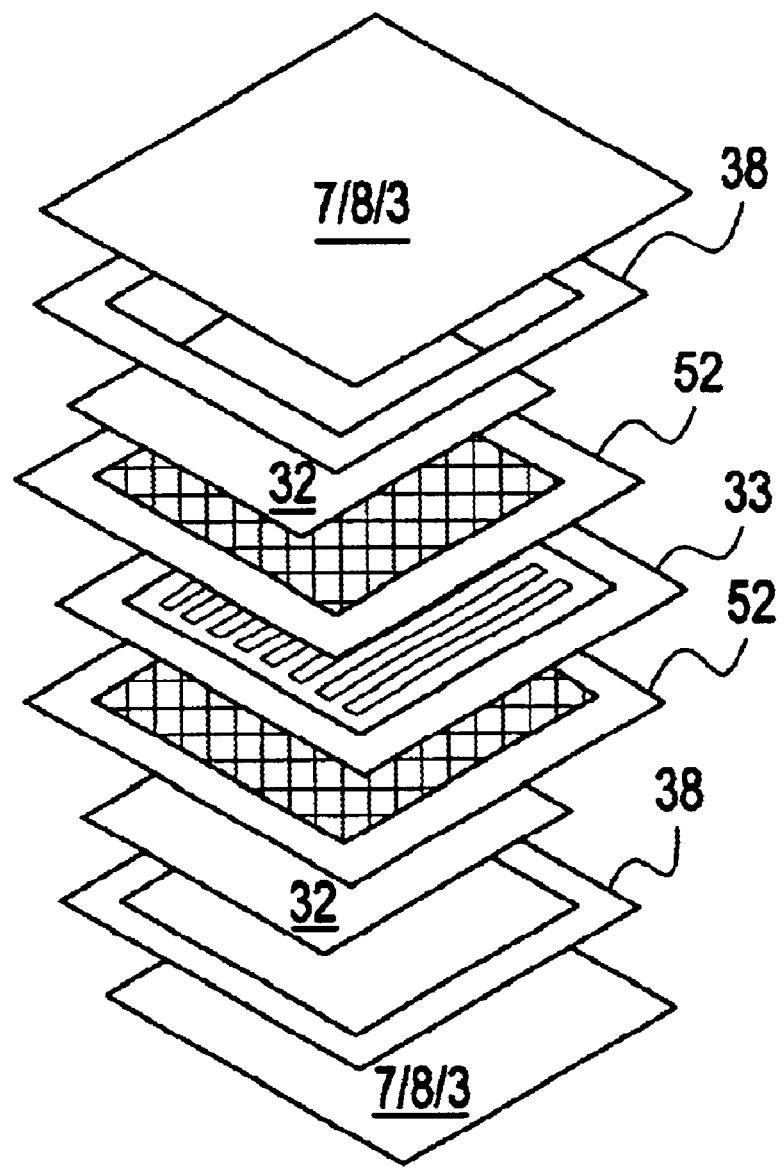
FIG. 6 is an expanded cross-sectional view of another embodiment of a bipolar electrochemical cell of the present invention.

In one embodiment, a fuel stack comprises: embossed titanium bipolar plate with the hydrogen flow field contacting electrode support 32 which supports the membrane and electrode assembly. On the opposite side of the membrane and electrode assembly is preferably a second carbon paper disposed between the assembly and the oxygen flow field of embossed titanium bipolar plate, Finally, adjacent to the coolant flow field of the bipolar plate is a rubber gasket. The subsequent cell of the cell stack comprises another embossed titanium bipolar plate with the coolant flow field contacting the rubber gasket and the hydrogen flow field contacting carbon paper. As shown in FIGS. 4–5, screen packs 52 can be disposed between any of the bipolar plates and the carbon paper and/or replace the carbon paper.

In an electrolyzer embodiment the sequence of components is a follows: a hydrogen flow field of an embossed bipolar plate, a screen pack, carbon paper, a membrane and electrode assembly, carbon paper, a screen pack, an oxygen flow field of an embossed bipolar plate with the opposite side thereof forming the hydrogen flow field of the subsequent cell in the cell stack.

The bipolar plate of the present invention offers provision for reactant and product flow passages, cooling passages, fluids sealing, and electrical conductivity to and from the reactor electrodes. This design reduces the costs normally associated with molded or machined graphite plates by utilizing embossed flow fields organized in bipolar fashion. Based on its simplicity of design, this electrochemical reactor and bipolar plate will allow for a significant reduction in material utilization, cost and weight, and will significantly reduce the labor burden associated with these parts. Unlike conventional bipolar plates which are about 100 mils (2.54 mm) thick or more, the bipolar plates of the present invention are less than about 20 mils (0.51 mm), with about 10 mils (0.25 mm) or less preferred.

Furthermore, by forming the flow fields in singular metal foils, each flow field in effect acts as a spring in the active area of the cell. This acts to maintain uniform compression against the cell membrane and electrode surface, thereby maintaining uniform contact across all component faces even as cell components creep over time. As is evidenced in prior art bipolar arrangements, because graphite and similar plates have poor elastic properties, gaps between components and electrodes can form over time.

Additionally, the use of metallic, particularly titanium, foil sheets produces a bipolar plate which: (1) has better thermal conductivity than graphite and therefore better heat rejection or cooling of the cell; (2) is less porous than graphite and therefore reduced losses due to diffusion; (3) better electrical conductivity than graphite; (4) improved structural integrity thereby enabling the use of thinner plates having better electrical and heat conductivity and fewer losses.

Finally, the electrochemical cell design of the present invention utilizes commercially available low cost materials that are readily fabricated into the desired configuration, thereby providing a substantially reduced cost electrochemical cell.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. An electrochemical cell stack, comprising:
   at least one first membrane assembly having a first anode electrode and a first cathode electrode disposed on opposite sides of an electrolyte membrane; and
   a bipolar plate comprising two foil sheets of an electrically conductive material, each said sheet having at least two flow fields formed thereon such that, when assembled, said sheets form at least three separate flow passages, and non-metallic gaskets located between said foil sheets and on a second side of each foil sheet opposite said gasket located between said foil sheets, wherein a first side of said bipolar plate is disposed adjacent said anode electrode of said first membrane assembly.

2. An electrochemical cell stack as in claim 1, further comprising a second membrane assembly having a second anode electrode and a second cathode electrode disposed on opposite sides of a second electrolyte membrane, said second cathode disposed adjacent to a second side of said bipolar plate.

3. An electrochemical cell stack as in claim 2, further comprising non-metallic gaskets located between said bipolar plate and said first and said second membrane assemblies.

4. An electrochemical cell stack as in claim 3, further comprising a first electrode support disposed between said bipolar plate and said first membrane assembly and a second electrode support disposed between said bipolar plate and said second membrane assembly.

5. An electrochemical cell stack as in claim 4, wherein said first and second membrane supports are one or more of carbon paper, carbon felt, carbon cloth, porous metal, expanded metal screen, woven screen, nonwoven screen, metal fiber, metal particulate, or a combination thereof.

6. An electrochemical cell stack as in claim 2, further comprising at least one foil sheet having a coolant flow field, forming when assembled, a separate coolant flow passage.

7. An electrochemical cell stack as in claim 1, wherein said foil sheet has a thickness of up to about 20 mils (0.51 mm).

8. An electrochemical cell stack as in claim 1, wherein said foil sheet has a thickness of about 2 mils (0.05 mm) to about 10 mils (0.35 mm).

9. An electrochemical cell stack as in claim 1, wherein said foil sheet comprises iron, titanium, niobium, nickel, cobalt, zirconium, hafnium, tungsten, tantalum, alloys comprising at least one of the foregoing metals, or superalloys comprising at least one of the foregoing metals.

10. An electrochemical cell stack as in claim 1, wherein said sheet is embossed with said flow fields.

11. An electrochemical cell stack, comprising:
    at least two membrane assemblies each having an anode electrode and a cathode electrode disposed on opposite sides of an electrolyte membrane;
    a bipolar plate having at least two foil sheets of an electrically conductive material, each said sheet having a first fluid flow field and a second fluid flow field such that, when assembled, said sheet forms separate first, second, and third fluid flow passages, said bipolar plate disposed between said anode electrode of said first membrane assembly and said cathode electrode of said second membrane assembly;
    a first elastomeric gasket disposed between said bipolar plate and said first membrane assembly, wherein said first elastomeric gasket contacts the periphery of said bipolar plate;
    a first screen pack disposed between said bipolar plate and said first membrane assembly, wherein said first screen pack is disposed adjacent to and in electrical communication with said anode of said first membrane assembly;
    a second elastomeric gasket disposed between said bipolar plate and said second membrane assembly, wherein said second elastomeric gasket contacts the periphery of said bipolar plate; and
    a second screen pack disposed between said bipolar plate and said second membrane assembly, wherein said second screen is disposed adjacent to said cathode of said second membrane assembly.

12. An electrochemical cell stack as in claim 11, wherein said foil sheet has a thickness of up to about 20 mils (0.51 mm).

13. An electrochemical cell stack as in claim 11, wherein said foil sheet has a thickness of about 2 mils (0.05 mm) to about 10 mils (0.35 mm).

14. An electrochemical cell stack as in claim 11, wherein said foil sheet comprises iron, titanium, niobium, nickel, cobalt, zirconium, hafnium, tungsten, tantalum, alloys comprising at least one of the foregoing metals, or superalloys comprising at least one of the foregoing metals.

15. An electrochemical cell stack as in claim 11, wherein said sheet is embossed with said flow fields.

16. An electrochemical cell stack comprising:
    at least two membrane assemblies each having an anode electrode and a cathode electrode disposed on opposite sides of an electrolyte membrane;
    a bipolar plate having at least one foil sheet of an electrically conductive material, said sheet having a first fluid flow field and a second fluid flow field, such that, said sheet forms a separate first, fluid flow passage, said bipolar plate disposed between said anode electrode of said first membrane assembly and said cathode electrode of said second membrane assembly;
    a first elastomeric gasket disposed between said bipolar plate and said first membrane assembly, wherein said first elastomeric gasket contacts the periphery of said bipolar plate;
    a first carbon paper disposed between said bipolar plate and said first membrane assembly, wherein said carbon paper is disposed adjacent to and in electrical communication with said anode of said first membrane assembly;
    a second elastomeric gasket disposed between said bipolar plate and said second membrane assembly, wherein said second elastomeric gasket contacts the periphery of said bipolar plate;
    a second carbon paper disposed between said bipolar plate and said second membrane assembly, wherein said carbon paper is disposed adjacent to said cathode of said second membrane assembly;
    a first screen pack disposed between said first carbon paper and said bipolar plate; and
    a second screen pack disposed between said second carbon paper and said bipolar plate.

17. An electrochemical cell stack, comprising:
    at least a first and second membrane assembly each having an anode electrode and a cathode electrode disposed on opposite sides of an electrolyte membrane; and
    a bipolar plate having a first and a second foil sheet of an electrically conductive material, said first foil sheet embossed with a first fluid flow field and a first coolant flow field, said second foil sheet embossed with a second fluid flow field and a second coolant flow field, such that, when assembled, said sheets form a separate first fluid flow passage, a coolant flow passage, and a second fluid flow passage, said bipolar plate disposed between said anode electrode of said first membrane assembly and said cathode electrode of said second membrane assembly, and non-metallic gaskets located between said first and second foil sheets and on a second side of each one of the first and second foil sheets opposite said gasket located between said first and second foil sheets.

18. An electrochemical cell stack as in claim 17, further comprising:
    a second bipolar plate disposed adjacent to said cathode electrode of said first membrane assembly; and
    a third bipolar plate disposed adjacent to said anode electrode of said second membrane assembly.

19. An electrochemical cell stack as in claim 17, wherein said foil sheets have a thickness of up to about 20 mils.

20. An electrochemical cell stack as in claim 19, wherein said foil sheets have a thickness of about 2 mils to about 10 mils.

21. An electrochemical cell stack as in claim 17, wherein said foil sheet comprises iron, titanium, niobium, nickel, cobalt, zirconium, hafnium, tungsten, tantalum, alloys comprising at least one of the foregoing metals, or superalloys comprising at least one of the foregoing metals.

22. A bipolar plate comprising:
    two foil sheets of an electrically conductive material, each of said sheets having at least two flow fields formed thereon such that, when assembled, said sheets form at least three separate flow passages; and
    non-metallic gaskets located between said foil sheets and on a second side of each foil sheet opposite said gasket located between said foil sheets.

23. A bipolar plate as in claim 22, wherein said foil sheets have a thickness of up to about 20 mils (0.51 mm).

24. A bipolar plate as in claim 22, wherein said foil sheets have a thickness of about 2 mils (0.05 mm) to about 10 mils (0.35 mm).

25. A bipolar plate as in claim 22, wherein each of said at least two flow fields has a rectangular, square, semicircular, circular, multi-sided or substantially annular cross-sectional geometry.

26. A bipolar plate as in claim 22, wherein said foil sheets comprise iron, titanium, niobium, nickel, cobalt zirconium, hafnium, tungsten, tantalum, alloys comprising at least one of the foregoing metals, or superalloys comprising at least one of the foregoing metals.

27. A bipolar plate as in claim 22, wherein said foil sheets is embossed with said flow fields.

\* \* \* \* \*